US008184098B2

(12) United States Patent  
Wu

(10) Patent No.: US 8,184,098 B2  
(45) Date of Patent: May 22, 2012

(54) MOUSE WITH CHANGEABLE FOOTPADS

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 506 days.

(21) Appl. No.: 12/557,318

(22) Filed: Sep. 10, 2009

(65) Prior Publication Data

US 2011/0001702 A1      Jan. 6, 2011

(30) Foreign Application Priority Data

Jul. 3, 2009  (TW) .................................. 98122512

(51) Int. Cl.  
*G06F 3/033*   (2006.01)

(52) U.S. Cl. ...................................................... 345/163

(58) Field of Classification Search .................. None  
See application file for complete search history.

(56) References Cited

U.S. PATENT DOCUMENTS

| | | | | |
|---|---|---|---|---|
| 6,480,184 B1 * | 11/2002 | Price | ............................. | 345/163 |
| 7,701,444 B2 * | 4/2010 | Chen | ............................. | 345/163 |
| 2003/0090394 A1 * | 5/2003 | Zagnoev | ......................... | 341/22 |
| 2008/0150895 A1 * | 6/2008 | Yu et al. | ........................ | 345/163 |
| 2010/0039384 A1 * | 2/2010 | Chen | ............................. | 345/163 |

* cited by examiner

*Primary Examiner* — Christopher R Lamb  
(74) *Attorney, Agent, or Firm* — Kirton McConkie; Evan R. Witt

(57) ABSTRACT

A mouse with changeable footpads is provided. The mouse includes an upper case, a lower cover and a plurality of mouse footpad modules. The lower cover is disposed under the upper case. The lower cover includes a plurality of footpad holes. The footpad modules are disposed in respective footpad holes. Each of the mouse footpad modules includes a base, a first footpad and a second footpad. The first footpad is disposed on the upper surface of the mouse footpad module. The second footpad is disposed on the lower surface of the mouse footpad module. By rotating the mouse footpad module, the first footpad or the second footpad is selectively exposed to the external surface of the lower cover.

10 Claims, 4 Drawing Sheets

MOUSE WITH CHANGEABLE FOOTPADS

FIELD OF THE INVENTION

The present invention relates to a mouse with changeable footpads, and more particularly to a mouse with a rotatable mouse footpad module.

BACKGROUND OF THE INVENTION

Due to the amazing power of computers, computers become essential data processing apparatuses in our daily lives. For example, the users could acquire important information (e.g. meteorological information, traffic information, news or uniform invoice number) via the computers. In addition, the users could communicate with their friends through instant messaging software, e-mails or video transmission by using the computers. As known, a human-machine interface input device is an essential component of the computer for communicating the user and the computer. In particular, a mouse is a widely-used human-machine interface input device.

By depressing the button or rotating the scroll wheel of the mouse, a corresponding command is executed or an image shown on the computer screen is scrolled. For smoothly moving the mouse on a desk surface, the inconspicuous mouse footpads that are arranged on the bottom of the mouse play important roles. The footpad has a function for effectively separating the mouse case from the desk surface in order to prevent the bottom of the mouse from be scraped or abraded. Generally, the smoothness of the moving mouse is dependent on the material of the mouse footpad. Therefore, those skilled in the art are focused on the development of novel materials of the mouse footpad. For example, Taiwanese Patent No. M346071 discloses an improved structure of a mouse footpad. For providing desired properties such as abrasion resistance, low friction and low loss, the mouse footpad is usually made of a ceramic material or a glass material. During the mouse is moved on a desk surface, the mouse footpad could offer low friction, low abrasion and smooth motion of the mouse in order to increase the application, economic value and competitiveness.

Regardless of any material, the mouse footpad is readily abraded off when the mouse footpad is used for a long time, because it is moved on the desk surface. As such, the demand on a changeable mouse footpad is gradually increased. For example, Taiwanese Patent No. M305390 discloses a mouse with a changeable footpad. The mouse comprises a case, at least one changeable plate and a plurality of footpad. The changeable plate is mounted on the bottom of the case. The footpads are respectively arranged on two opposite surfaces of the changeable plate. When the footpads on one surface of the changeable plate are abraded off, the changeable plate could be turned over and then mounted on the bottom of the case again. As such, the footpads on the other surface of the changeable plate could be continuously used in order to extend the use life of the mouse footpads. Since the changeable plate needs to be disassembled from the case during the process of changing the footpads, some drawbacks possibly occur. For example, it is troublesome to disassemble the changeable plate because a disassembling is needed. In addition, the changeable plate is possibly damaged during the process of disassembling the changeable plate.

Therefore, there is a need of providing a mouse footpad that is easily and conveniently changed according to the user's requirement. Moreover, the footpads of the mouse could be individually selected by the user, so that the materials of the footpads in contact with the desk surface are changed. In comparison with the prior art, such footpads have enhanced convenience and using flexibility.

SUMMARY OF THE INVENTION

The present invention provides a mouse with changeable footpads, is which the mouse includes at least one rotatable mouse footpad module for increasing the ease of changing the mouse footpad module.

In accordance with an aspect of the present invention, there is provided a mouse with changeable footpads. The mouse includes an upper case, a lower cover and a plurality of mouse footpad modules. The lower cover is disposed under the upper case, and includes an internal surface sheltered by the upper case and external surface contacted with a desk surface. The lower cover further includes a plurality of footpad holes. Each of the footpad holes has two rotary shaft receiving parts. The footpad modules are disposed in respective footpad holes. Each of the mouse footpad modules includes a base, a first footpad and a second footpad. The base includes an upper surface, a lower surface and two rotary shafts. The rotary shafts are accommodated within respective rotary shaft receiving parts. The upper surface and the lower surface are parallel with each other. The two rotary shafts have respective shaft centers arranged in the same line. The first footpad is disposed on the upper surface. The second footpad is disposed on the lower surface. The base is rotatable with respect to the rotary shaft receiving parts through the rotary shafts, so that the first footpad or the second footpad is exposed to the external surface of the lower cover.

In an embodiment, each of the mouse footpad modules includes a position-limiting tongue depressor extended from a lateral side of the base, and each of the footpad holes includes two position-limiting recesses to be sustained against the position-limiting tongue depressor.

In an embodiment, the mouse further includes a plurality of mouse pad module caps for sheltering respective footpad holes and fixing the mouse footpad modules in respective footpad holes.

In an embodiment, the first footpad and the second footpad have different friction coefficients.

In an embodiment, the first footpad and the second footpad have an identical friction coefficient.

In an embodiment, the first footpad and the second footpad are made of polytetrafluoroethene (Teflon), polyoxymethylene (POM), ultrahigh-molecular-weight polyethylene (UPE), steel, glass or Ruby Ball.

In an embodiment, the first footpad and the second footpad are sheet-like footpads.

In an embodiment, the first footpad is a spherical footpad, and the second footpad is a sheet-like footpad.

In an embodiment, each of the mouse footpad modules further includes a fixing lid for sheltering the spherical footpad. The fixing lid has a circular aperture in a center thereof, and a portion of the spherical footpad is protruded out of the circular aperture.

In an embodiment, the first footpad and the second footpad are respectively fixed on the upper surface and the lower surface of the base by a gluing process, an embedding process, a screwing process or an ultrasonic welding process.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
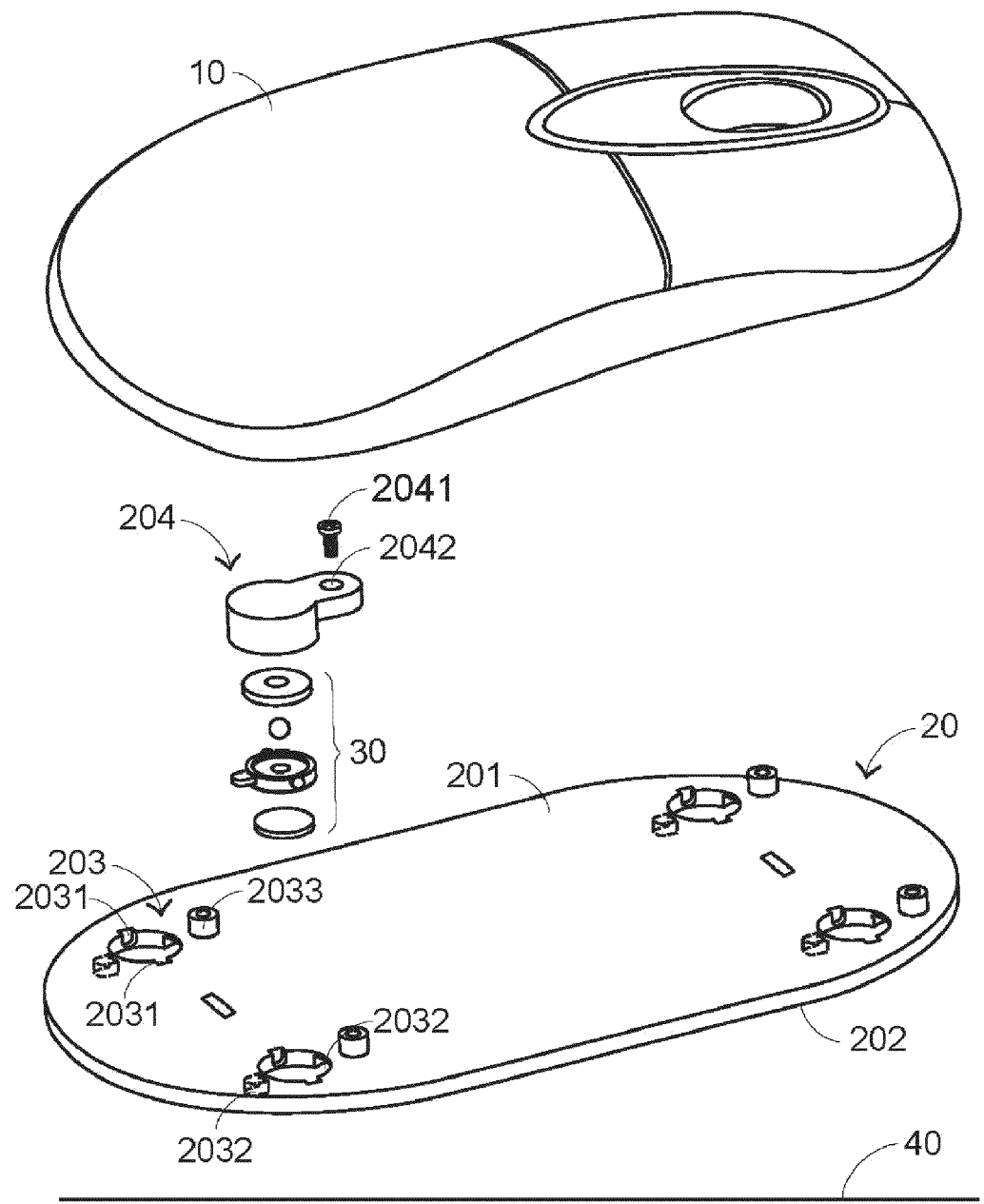
FIG. 1 is a schematic exploded view illustrating a mouse with changeable footpads according to an embodiment of the present invention.
Figure 2:
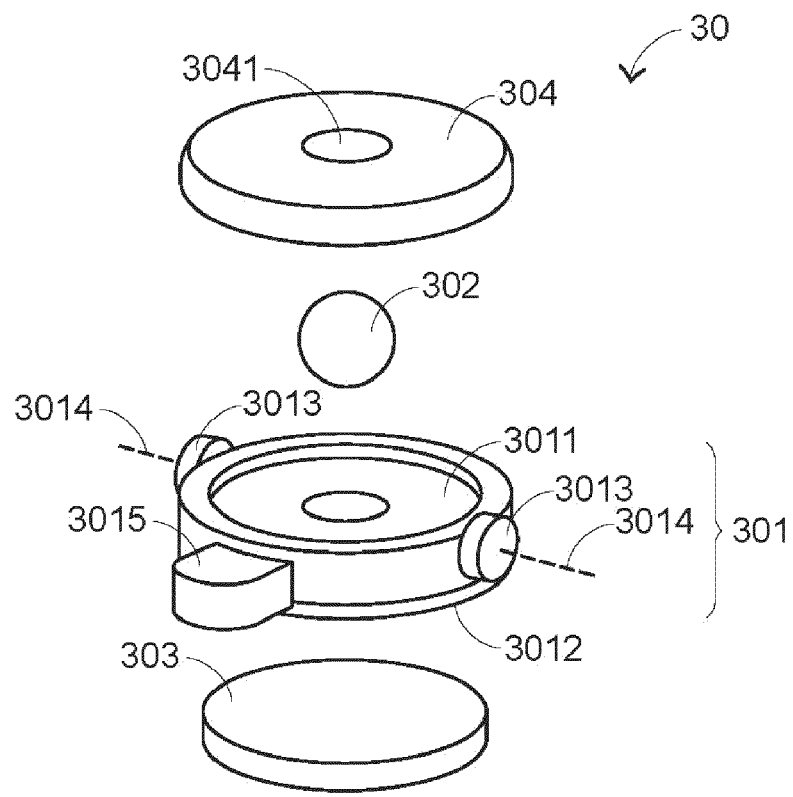
FIG. 2 is a schematic exploded view illustrating a mouse footpad module.
Figure 3:
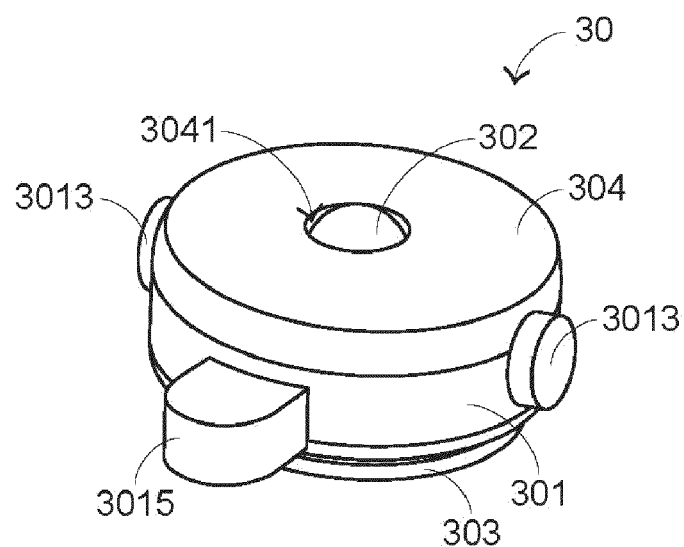
FIG. 3 is a schematic assembled view illustrating the mouse footpad module shown in FIG. 2.

The present invention provides a mouse with changeable footpads. The mouse has a rotatable mouse footpad module for increasing the ease of changing the mouse footpad module. FIG. 1 is a schematic exploded view illustrating a mouse with changeable footpads according to an embodiment of the present invention. FIG. 2 is a schematic exploded view illustrating a mouse footpad module. FIG. 3 is a schematic assembled view illustrating the mouse footpad module shown in FIG. 2. Please refer to FIGS. 1, 2 and 3. The mouse comprises an upper case 10, a lower cover 20 and a plurality of mouse footpad modules 30. The lower cover 20 is disposed under the upper case 10. The lower cover 20 comprises an internal surface 201 and an external surface 202. The internal surface 201 is sheltered by the upper case 10. The external surface 202 could be contacted with a desk surface 40. The lower cover 20 further comprises a plurality of footpad holes 203. Each of the footpad holes 203 has a shape mating with a corresponding mouse pad module cap 204. For clarification and brevity, only a mouse footpad module 30, a mouse pad module cap 204 and a corresponding footpad hole 203 are shown in the drawings. In an embodiment, the footpad hole 203 comprises two rotary shaft receiving parts 2031 for respectively accommodating two rotary shafts 3013. In addition, the footpad hole 203 comprises two position-limiting recesses 2032 corresponding to a position-limiting tongue depressor 3015 of the mouse footpad module 30. The position-limiting tongue depressor 3015 is sustained against one of the position-limiting recesses 2032 of the footpad hole 203.

The mouse footpad modules 30 are disposed in corresponding footpad holes 203 of the lower cover 20. In an embodiment, each of the mouse footpad modules 30 comprises a base 301, a first footpad 302 and a second footpad 303. The base 301 comprises an upper surface 3011, a lower surface 3012 and two rotary shafts 3013. The rotary shafts 3013 are accommodated within respective rotary shaft receiving parts 2031. The upper surface 3011 and the lower surface 3012 are parallel with each other. The rotary shafts 3013 have respective shaft centers 3014. These two shaft centers 3014 are arranged in the same line. The first footpad 302 is disposed on the upper surface 3011. The second footpad 303 is disposed on the lower surface 3012. After the rotary shafts 3013 are accommodated within respective rotary shaft receiving parts 2031, the base 301 could be rotated with respect to the rotary shafts 3013. As such, the first footpad 302 or the second footpad 303 is exposed to the external surface 202 of the lower cover 20. In accordance with a key feature of the present invention, after the rotary shafts 3013 of the mouse footpad module 30 are embedded into corresponding rotary shaft receiving parts 2031, the mouse footpad module 30 is rotatable. In some embodiments, a screw 2041 is optionally penetrated through a fastening perforation 2042 of the mouse pad module cap 204 and the mouse pad module cap 204 is screwed in the fastening slot 2033 of the lower cover 20, so that the mouse footpad module 30 is prevented from being detached from the footpad hole 203.

In an exemplary mouse footpad module 30 of the present invention, the first footpad 302 is a spherical footpad and the second footpad 303 is a sheet-like footpad. The first footpad 302 and the second footpad 303 are made of identical or different materials selected from polytetrafluoroethene (Teflon), polyoxymethylene (POM), ultrahigh-molecular-weight polyethylene (UPE), steel, glass, Ruby Ball, or the like. It is preferred that the first footpad 302 and the second footpad 303 are made of different materials with different friction coefficients. Due to the different friction coefficients, the manipulative properties of the first footpad 302 and the second footpad 303 are distinguishable when the mouse footpad module 30 is rotated to change the footpads. Even if the first footpad 302 and the second footpad 303 are made of an identical material, the footpads of the mouse footpad module 30 could still be easily changed in comparison with the prior art.

It is noted that, however, those skilled in the art will readily observe that the first footpad 302 and the second footpad 303 of the mouse footpad module 30 have identical or different shapes. In an embodiment, both of the first footpad 302 and the second footpad 303 are sheet-like footpads or spherical footpads. Alternatively, one of the first footpad 302 and the second footpad 303 is a sheet-like footpad, and the other is a spherical footpad.

In a case that the first footpad 302 and the second footpad 303 are made of the identical material but have different shapes, the manipulative properties of the first footpad 302 and the second footpad 303 are distinguishable because they have different contact areas with the desk surface 40. Whereas, in a case that the first footpad 302 and the second footpad 303 have the same shape but are made of different materials, the manipulative properties of the first footpad 302 and the second footpad 303 are also distinguishable because they have different friction forces in contact with the desk surface 40. Even if the first footpad 302 and the second footpad 303 have the same shape and are made of the identical material, the footpads of the mouse footpad module 30 are easily changed in comparison with the prior art. Since the mouse footpad module 30 is rotatable in a clockwise direction or an anti-clockwise direction with respect to the rotary shafts 3013, the footpads that are abraded could be easily changed.

The first footpad 302 and the second footpad 303 are respectively fixed on the upper surface 3011 and the lower surface 3012 by a fastening process. The fastening process includes but is not limited to a gluing process, an embedding process, a screwing process or an ultrasonic welding process. In some embodiments, the mouse footpad module 30 further comprises a fixing lid 304. The fixing lid 304 has a circular aperture 3041 in the center thereof. The spherical footpad of the first footpad 302 is sheltered by the fixing lid 304 and disposed on the upper surface 3011 of the base 301 such that a portion of the spherical footpad is partially protruded out of the circular aperture 3041. As a consequence, the first footpad 302 is tightly fixed on the upper surface 3011 of the base 301.

Figure 4A:
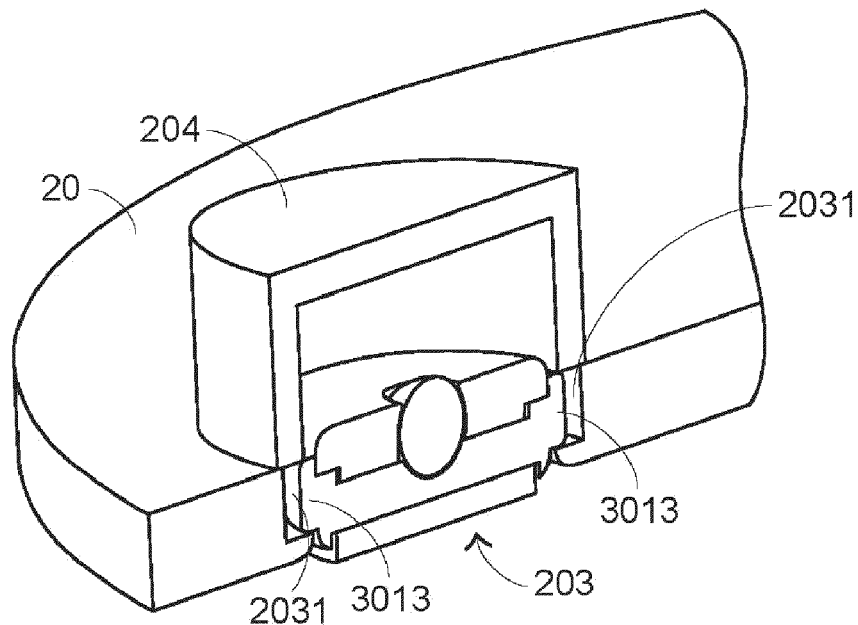
FIG. 4A is a schematic cutaway view illustrating the combination of the lower cover, the mouse footpad module and the mouse pad module cap of the mouse of the present invention.
Figure 4B:
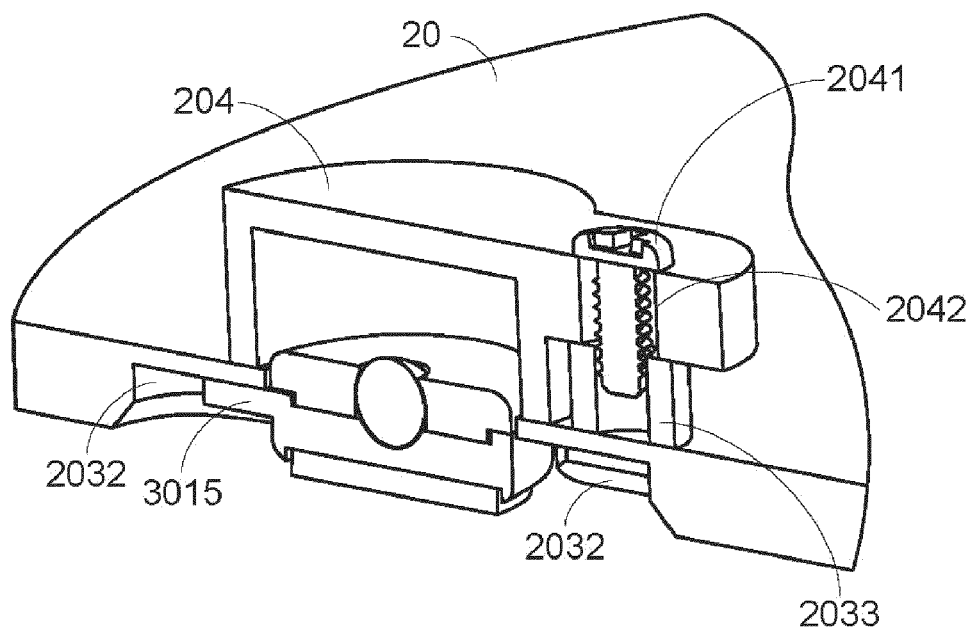
FIG. 4B is a schematic cutaway view illustrating the combination of the lower cover, the mouse footpad module and the mouse pad module cap of the mouse and taken in a viewpoint orthogonal to FIG. 4A.

FIG. 4A is a schematic cutaway view illustrating the combination of the lower cover, the mouse footpad module and the mouse pad module cap of the mouse of the present invention. FIG. 4B is a schematic cutaway view illustrating the combination of the lower cover, the mouse footpad module and the mouse pad module cap of the mouse and taken in a viewpoint orthogonal to FIG. 4A. As shown in FIG. 4A, the two rotary shafts 3013 of the mouse footpad module 30 are accommodated within respective rotary shaft receiving parts 2031 of the footpad hole 203. For changing the footpad, the mouse footpad module 30 could be in a clockwise direction or an anti-clockwise direction with respect to the rotary shafts 3013. Since the footpad hole 203 is sheltered by the mouse pad module cap 204, the mouse footpad module 30 is restrained from being detached from the footpad hole 203. As shown in FIG. 4B, the position-limiting tongue depressor 3015 of the mouse footpad module 30 is sustained against one of the position-limiting recesses 2032 of the footpad hole 203. For changing a footpad of the mouse footpad module 30, the position-limiting tongue depressor 3015 of the mouse footpad module 30 needs to be sustained against the other of the position-limiting recesses 2032 of the footpad hole 203. As a consequence, the angle of rotating the mouse footpad module 30 is effectively limited. Furthermore, as shown in FIG. 4B, the screw 2041 is penetrated through the fastening perforation 2042 of the mouse pad module cap 204 and the mouse pad module cap 204 is screwed in the fastening slot 2033 of the lower cover 20.

Figure 5A:
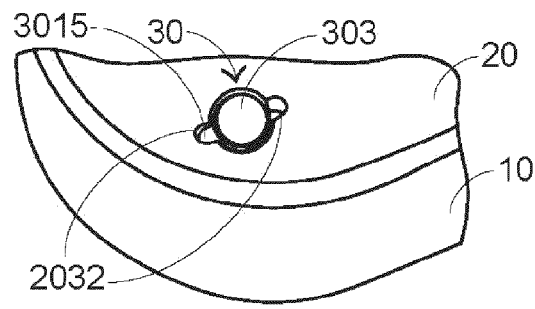
FIGS. 5A~5D are schematic views illustrating the steps of changing a footpad of the mouse according to the present invention.
Figure 5B:
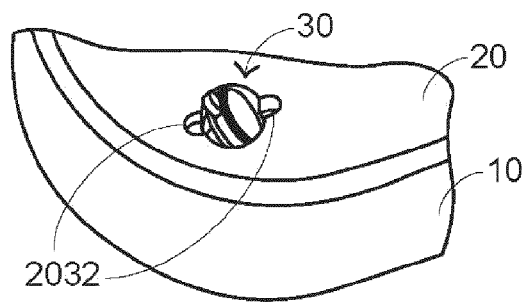
Figure 5C:
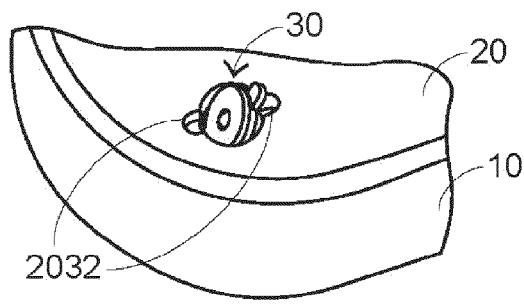
Figure 5D:
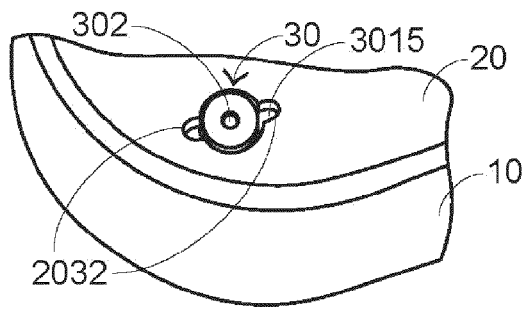

FIGS. 5A~5D are schematic views illustrating the steps of changing a footpad of the mouse according to the present invention. As shown in FIG. 5A, the second footpad 303 is originally exposed to the external surface 202 of the lower cover 20. As shown in FIGS. 5B~5D, By rotating the mouse footpad module 30 with respect to the rotary shafts 3013 (see FIG. 2), the first footpad 302 is changed to be exposed to the external surface 202 of the lower cover 20. As also shown in FIGS. 5A~5D, the location of the optional position-limiting tongue depressor 3015 is switched from one position-limiting recess 2032 to the other position-limiting recess 2032, so that the angle of rotating the mouse footpad module 30 is effectively limited.

From the above description, the mouse of the present invention has changeable footpads. By rotating the mouse footpad module to change the footpads, different manipulative properties are obtainable. Moreover, a combination of different footpads could provide a desired manipulative property. For example, in a case that the mouse has four mouse footpad modules, a combination of four spherical footpads, a combination of four sheet-like footpads, a combination of two spherical footpads and two sheet-like footpads, or a combination of one spherical footpad and three sheet-like footpads could be selected to be exposed to the external surface of the lower cover, thereby providing a desired manipulative property.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse with changeable footpads, said mouse comprising:
   an upper case;
   a lower cover disposed under said upper case, and comprising an internal surface sheltered by said upper case and external surface contacted with a desk surface, wherein said lower cover further comprises a plurality of footpad holes, and each of said footpad holes has two rotary shaft receiving parts; and
   a plurality of mouse footpad modules disposed in respective footpad holes, wherein each of said mouse footpad modules comprises:
      a base comprising an upper surface, a lower surface and two rotary shafts, wherein said rotary shafts are accommodated within respective rotary shaft receiving parts, said upper surface and said lower surface are parallel with each other, and said two rotary shafts have respective shaft centers arranged in the same line;
      a first footpad disposed on said upper surface; and
      a second footpad disposed on said lower surface,
      wherein said base is rotatable with respect to said rotary shaft receiving parts through said rotary shafts, so that said first footpad or said second footpad is exposed to said external surface of said lower cover.

2. The mouse with changeable footpads according to claim 1 wherein each of said mouse footpad modules comprises a position-limiting tongue depressor extended from a lateral side of said base, and each of said footpad holes comprises two position-limiting recesses to be sustained against said position-limiting tongue depressor.

3. The mouse with changeable footpads according to claim 1 wherein said mouse further comprises a plurality of mouse pad module caps for sheltering respective footpad holes and fixing said mouse footpad modules in respective footpad holes.

4. The mouse with changeable footpads according to claim 1 wherein said first footpad and said second footpad have different friction coefficients.

5. The mouse with changeable footpads according to claim 1 wherein said first footpad and said second footpad have an identical friction coefficient.

6. The mouse with changeable footpads according to claim 1 wherein said first footpad and said second footpad are made of polytetrafluoroethene (Teflon), polyoxymethylene (POM), ultrahigh-molecular-weight polyethylene (UPE), steel, glass or Ruby Ball.

7. The mouse with changeable footpads according to claim 1 wherein said first footpad and said second footpad are sheet-like footpads.

8. The mouse with changeable footpads according to claim 1 wherein said first footpad is a spherical footpad, and said second footpad is a sheet-like footpad.

9. The mouse with changeable footpads according to claim 8 wherein each of said mouse footpad modules further comprises a fixing lid for sheltering said spherical footpad, wherein said fixing lid has a circular aperture in a center thereof, and a portion of said spherical footpad is protruded out of said circular aperture.

10. The mouse with changeable footpads according to claim 1 wherein said first footpad and said second footpad are respectively fixed on said upper surface and said lower surface of said base by a gluing process, an embedding process, a screwing process or an ultrasonic welding process.

* * * * *